INVENTOR.
JOSEPH R. BOURNE.
BY Herman Seid
ATTORNEY.

INVENTOR.
JOSEPH R. BOURNE

BY

ATTORNEY

United States Patent Office 3,038,316
Patented June 12, 1962

3,038,316
ABSORPTION REFRIGERATION SYSTEM
Joseph R. Bourne, East Syracuse, N.Y., assignor to Carrier Corporation, Syracuse, N.Y., a corporation of Delaware
Filed July 7, 1958, Ser. No. 746,776
1 Claim. (Cl. 62—107)

This invention relates to absorption refrigeration systems. More particularly, this invention relates to an arrangement for increasing the efficiency of an absorber in an absorption refrigeration system.

The capacity of an absorption refrigeration system is predicated to a great extent upon the ability of the absorber to effect absorption of vapor from the evaporator by solution flowing from the generator. This invention involves circulating vapor which may have passed through the absorber unabsorbed, back through the absorber, by feeding it into the solution flowing from the generator to the absorber.

The chief object of this invention is the provision of an arrangement for promoting the efficiency of an absorber in an absorption refrigeration system by recirculating unabsorbed vapor through the absorber.

Another object of the invention is the provision of an arrangement for pre-absorbing into solution flowing in the solution circuit of an absorption refrigeration system vapor that has been unabsorbed in the absorber, prior to the entrance of the solution into the absorber.

A further object of the invention is the provision of a method of improving the efficiency of the absorber in an absorption refrigeration system by feeding unabsorbed vapor from the absorber into the stream of solution flowing to the absorber from the generator.

Another object of the invention is the provision of an arrangement for increasing the efficiency of the absorber of an absorption refrigeration system including means for supplying solution from the generator to the absorber of the system and means for supplying unabsorbed vapor from the absorber to the solution being supplied to the absorber by the first means.

Figure 1:
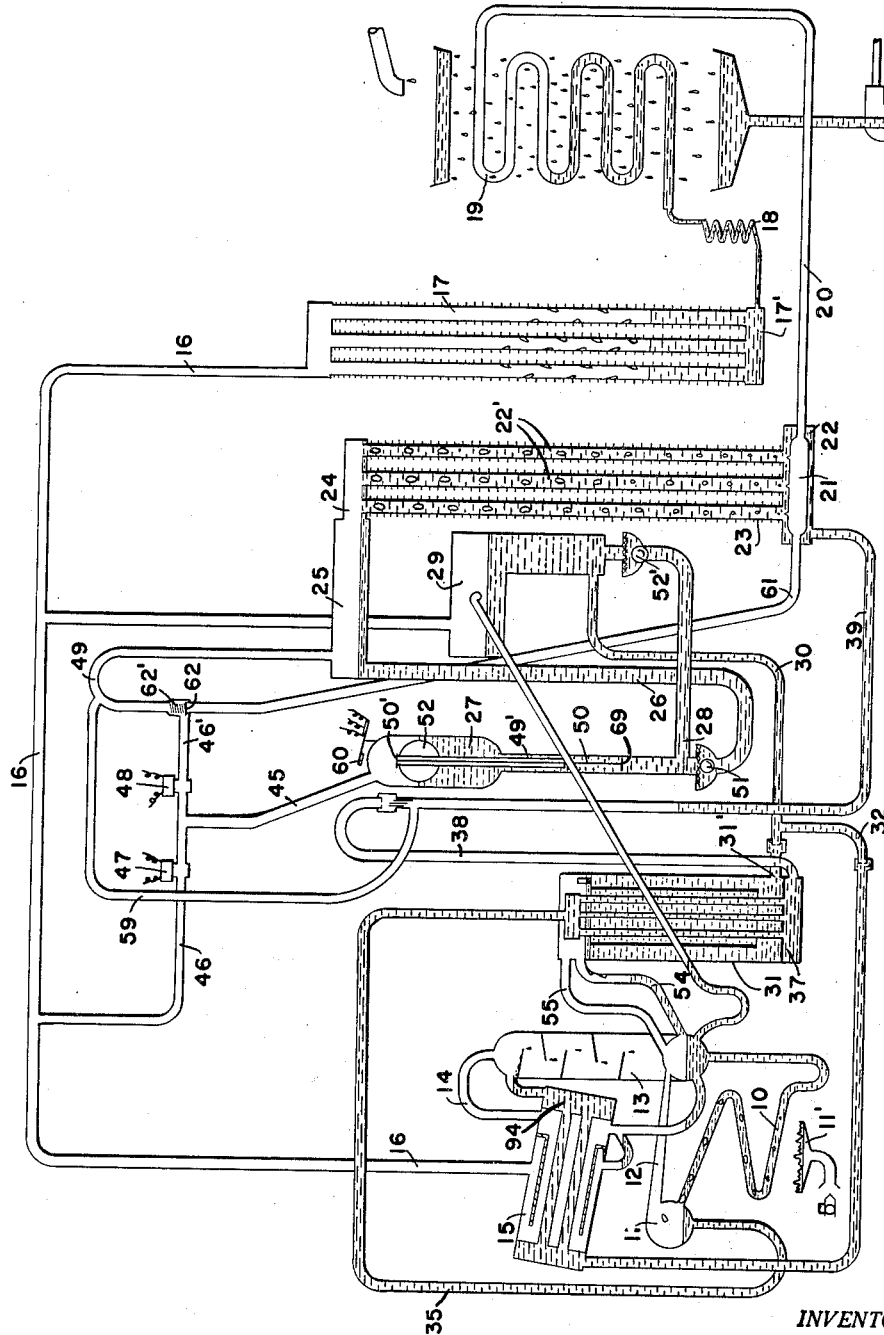
Figure 2:
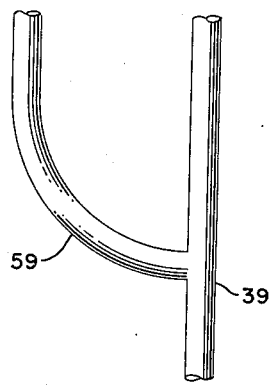
Figure 3:
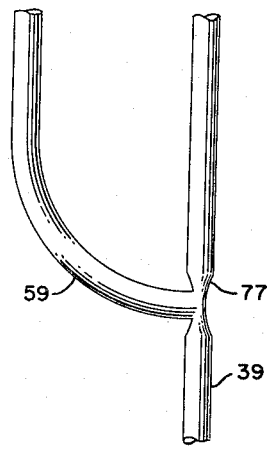

The attached drawings illustrate a preferred embodiment of the invention, in which
FIGURE 1 is a schematic view of an absorption refrigeration system employing the invention;
FIGURE 2 is a partial view of a portion of the system illustrating the invention; and
FIGURE 3 is a partial view of an embodiment of the invention.

The particular system, chosen for the purpose of illustration and not limitation, involves an absorption refrigeration system having a solution of water and ammonia wherein the ammonia acts as the refrigerant and the water as an absorbent. A solution of water and ammonia is located in the generator 10 and is subjected to heat from a gas burner 11' under the operation of a valve controlled by a thermostat in the atmosphere that is to be cooled by the absorption refrigeration system. Heat from the burner 11' causes portions of the ammonia-water mixture to vaporize and flow upward through the generator to separation chamber 11. In the separation chamber 11 the gaseous portion of the mixture flows through line 12 and to an analyzer 13. It will be understood that the gaseous portion of the mixture flowing in line 12 contains both ammonia vapor and water vapor. In the analyzer 13 the gaseous mixture flows upwardly through a tower portion where it is passed in heat transfer relation with solution flowing in the solution circuit of the machine in a manner to be described later. In the analyzer portions of the water vapor in the mixture condense into the solution and flow by gravity to the bottom of the analyzer where they join with solution flowing in other portions of the solution circuit for transmittal to the generator. Also in the analyzer, portions of the ammonia in the solution flowing in heat transfer relation with the vapor are vaporized so that the mixture flowing in line 14 from analyzer 13 contains a fairly strong proportion of ammonia vapor as compared with water vapor.

Additional heat transfer action occurs in rectifier 15 as the vaporous mixture flowing in line 14 is once again passed in heat transfer relation with solution flowing in a portion of the solution circuit. The analyzer and rectifier combination forms a separate invention, Serial No. 746,705, filed July 7, 1958, in the name of Richard H. Merrick and assigned to the assignee of this invention. In the rectifier the vapor flowing from line 14 travels upwardly through the central portion of the rectifier in heat transfer relation with solution flowing in confined passages in the rectifier. This has the effect of condensing out additional portions of the water vapor in the gaseous mixture flowing from the analyzer. Thus, when the vapor leaves he rectifier 15 through line 16 it is relatively free of water vapor and consists substantially entirely of ammonia vapor.

From the line 16 the ammonia vapor flows to condenser 17 where it is liquefied as it rejects its heat to air or other medium flowing over the surface of the condenser. The liquid refrigerant collects in the lower header 17' of the condenser and flows through capillary 18 or any other convenient restrictor to evaporator 19.

In the evaporator 19 the liquid ammonia refrigerant is vaporized as heat is extracted from a medium flowing over the surface of the coil 19. In the structure shown the medium is a supply of chilled water flowing in a chilled water circuit. The chilled water is piped or transmitted to a heat exchanger in an enclosure to be supplied with conditioned air.

The vaporous refrigerant created in the evaporator flows through line 20 into the absorber 23. Initially the vaporous refrigerant flowing in line 20 collects in a gas manifold 21 located in a lower header 22 of the absorber 23. The header 22 receives and accommodates a portion of the solution in the solution circuit. As will be pointed out in detail hereinafter the solution which collects in the header 22 of the absorber is deficient in refrigerant and possesses good absorbing characteristics so it is referred to as strong solution. The refrigerant vapor, bubbling up through a series of tubes 22' in communication with the lower solution header and likewise containing a quantity of strong solution, is absorbed by the solution in the tubes as it progresses upwardly to the upper header 24 of the absorber 23. Thus, the solution which is carried up by the vapor lift action and the pressure differential in the solution circuit reaches the top header 24. The solution in the upper header 24 has a relatively large percentage of vaporous refrigerant absorbed therein so that it possesses weak absorbing characteristics. Therefore it is characterized as weak solution. The weak solution wich collects in the upper header 24 of the absorber 23 overflows into a low side reservoir 25.

In order to transmit the solution which has collected in the low side reservoir 25 to the generator where it will be subjected to the heat of burner 11' in the manner described above, a solution transfer vessel is employed. The solution transfer vessel together with its operating mechanism forms the subject of a separate patent application Serial No. 746,834, filed July 7, 1958, in the names of Richard H. Merrick and Richard A. English, and assigned to the assignee of this invention. Briefly, the solution transfer vessel 27 is arranged so that the interior thereof may be alternately equalized to high side system pressure or low side system pressure. When the interior of the vessel is equalized to low side pressure, the difference in the elevation of the low side reservoir 25 and the vessel 27 is such that solution which has collected in the low side reservoir is free to flow by gravity into the solution transfer vessel. This flow takes place through line 26 which has a check valve 51 of the ball type assembled therein. In addition thereto the solution transfer vessel contains a float member 52 which carries a switch actuating element 50 as it rises and falls in response to the difference in elevation of the solution within the transfer vessel. As the float moves upwardly during the filling cycle the switch actuating element, which is provided with a head portion 50' of a magnetic material, attracts a lever 60 likewise having an end portion of magnetic material but of an opposite polarity. Once the lever 60 is rotated counter-clockwise in response to the magnetic attraction of the two elements described, a circuit is made which eventually closes off communication between the interior of the vessel and low side of the refrigeration system. As will be observed from a consideration of FIGURE 1 line 45 connects the interior of the vessel 27 with branch line 46' and line 49 to the low side of the system. Valve 48 controls communication between the interior of the vessel and the low side of the pressure through the path described. A branch line 46 connects line 45 with the high side of the system and flow through that particular branch is controlled by solenoid valve 47. Thus, when the switch arm 60 has been actuated in the manner described circuitry is made such that valve 48 is closed and valve 47 is opened. Under these circumstances the interior of the vessel is equalized with high side pressure through line 46 and line 16. The parts are so arranged that the liquid that has collected within the vessel 27 is free to flow by gravity to a high side vessel 29 through line 28 having a ball type check valve 52' located therein.

As the solution flows from the vessel in the manner described, float 52 moves downwardly in the vessel but does not immediately carry switch actuating element 50, which has a sliding fit with the float, away from the magnetic attraction provided by the end of lever arm 60. Thus, the interior of the vessel is maintained in communication with high side pressure until the vessel is substantially exhausted of its contents. This is accomplished by providing an extension 49' on the float which in turn engages the opposite end 69 of the switch actuating element 50 when the ball or float 52 approaches the bottom of the solution transfer vessel 27.

The lever 60 is free to return to its normal operating position by virtue of the action of a spring, not shown, once the switch actuating element 50 has been carried downwardly through operation of extension 49' and the end 69 of the switch actuating element 50. Thus, the control circuitry is operative under these circumstances to close valve 47 and open valve 48 which in turn once again equalizes the interior of the vessel 27 to low pressure in reservoir 25.

In order to release the high pressure gas trapped in the vessel 27 after the solution has drained from the vessel, a blow-down line 61 normally closed by plate 62 operating under the influence of spring 62' is provided. At the conclusion of the expulsion of weak solution from the vessel the high pressure trapped gas flows upwardly past valve 48 and is of sufficient magnitude to cause the plate to rise from its position as shown on FIGURE 1 permitting communication between line 61 and the interior of the vessel 27. Thus, the trapped high pressure gas flows downwardly into line 61 to the gas manifold 21 where it is expanded to low side pressure and then upwardly through the absorber to be absorbed by the solution in the absorber.

After the solution has collected in the vessel 29 it is free to flow through line 30 to either branch line 32 or branch line 31'. That portion of the relatively cool weak solution flowing in line 32 flows through the rectifier to perform the heat transfer occurring in that unit. From the rectifier 15 the solution flows into header 94 and on into the analyzer 13 to perform the heat transfer action described above in that unit. The weak solution then collects in the bottom of the analyzer for transmittal to the generator.

That portion of the weak solution flowing from reservoir 29 through line 31' enters solution heat exchanger 31 where it is passed in heat transfer relation with strong solution flowing from the generator. The weak solution under these circumstances is heated and flows through line 54 into the bottom portion of the analyzer where it is transmitted to the generator. Any gases that may form by flashing action in the heat exchanger collect in the upper portion of the heat exchanger and flow through line 55 into the analyzer where it will join with the vapor flowing from the generator to the analyzer.

The strong solution which accumulates in chamber 11 flows through line 35 in heat transfer relation with the weak solution flowing upwardly through the solution heat exchanger. The strong solution then collects in the lower header 37 of the solution heat exchanger and flows via lines 38 and 39 to the absorber 23.

In order to promote the operational efficiency of the absorber I provide a line 59 connecting line 49 and line 39. The purpose of this line is to permit any gas which may have passed through the absorber unabsorbed and which may collect in the low side reservoir 25 to flow via line 49 and line 59 into the solution stream and be absorbed therewith or carried by the solution to the absorber in the event the solution is saturated. Thus, the solution presented to the absorber is or may be relatively saturated. The action described may be considered as a pre-absorbing action and has the effect of promoting a more efficient absorption action.

The absorption action is more efficient because the cooling of the solution necessary to carry away the heat of absorption may occur immediately at the lower portion of the tubes in communication with the lower solution header 22. In other words, the cooling which is necessary in order to enable the solution to be in a position to absorb more vapor, takes place initially at a lower physical level in the vertical tubular members.

With the invention herein disclosed the solution entering the absorber may be at its saturation temperature or near it so that it can be cooled promptly and the absorption action initiated promptly.

To further appreciate the invention it will be understood that the absorbing capacity of the solution being fed to the absorber is related to the temperature of the solution. The absorption action that occurs in the absorber may be considered in the following manner; a portion or a slug of liquid solution deficient in refrigerant but possessing strong absorption characteristics is mixed with a quantity of vaporous refrigerant. The slug of solution absorbs the vapor but in so doing has its temperature raised by the heat of absorption or condensation, however it may be termed.

This heat is carried away by the action of a cooling medium employed for the purpose. This has the effect of conditioning the slug so it may absorb another quantity of vapor.

By providing an arrangement of the kind described wherein vapor unabsorbed in the absorber is supplied to strong solution flowing enroute to the absorber, it is possible to design the height of the tubular members without regard for complete absorption action in the tubes. Thus absorption will occur throughout the height of the tubes, effectively utilizing the tubes for absorption action. In the event vapor passes unabsorbed through the absorber, pressure build-up in the absorber is avoided resulting in more stable operation.

FIGURE 3 illustrates an embodiment of the invention having a construction assembled in the strong solution line for promoting flow of vapor from the absorber into the solution line. Venturi 77 is connected into the solution line to perform this action.

While I have described preferred embodiments of the invention, it will be understood the invention is not limited thereto since it may be otherwise embodied within the scope of the following claim.

I claim:

The method of effecting absorption of refrigerant vapor into a solution of refrigerant and absorbent in an absorption refrigeration system which consists in the steps of supplying vaporous refrigerant created in the evaporator to the absorber for absorption by the solution, and delivering a continuous stream of solution having a composition of refrigerant and absorbent conducive to absorption of refrigerant to the absorber through a path including a connection to a location in the absorber wherein refrigerant vapor, unabsorbed, in its passage through the absorber, collects so that the unabsorbed vapor may be either absorbed or delivered to the absorber by the action of the flowing solution for recirculation therethrough.

References Cited in the file of this patent

UNITED STATES PATENTS

| | | |
|---|---|---|
| 1,659,681 | Davenport | Feb. 21, 1928 |
| 2,146,077 | Kuenzli | Feb. 7, 1939 |
| 2,207,260 | Kuenzli | July 9, 1940 |
| 2,290,506 | Thomas | July 21, 1942 |
| 2,565,943 | Berestneff | Aug. 28, 1951 |
| 2,592,712 | Knoy | Apr. 15, 1952 |
| 2,610,482 | Berry | Sept. 16, 1952 |